United States Patent [19]
Gaddis et al.

[11] Patent Number: 4,888,114
[45] Date of Patent: Dec. 19, 1989

[54] SINTERED COATING FOR POROUS METALLIC FILTER SURFACES

[75] Inventors: Joseph L. Gaddis, Clemson; Daniel A. Jernigan, Seneca, both of S.C.

[73] Assignee: E. I. Du POnt de Nemours and Company, Wilmington, Del.

[21] Appl. No.: 310,141

[22] Filed: Feb. 10, 1989

[51] Int. Cl.$^4$ .............................................. B01D 39/14
[52] U.S. Cl. .............................. 210/500.25; 427/181; 427/190; 427/244; 427/376.5; 427/435; 55/523; 55/524
[58] Field of Search ......................... 55/523, 524, 158; 210/500.25, 639, 638; 427/244, 181, 190, 376.5, 435

[56] References Cited

U.S. PATENT DOCUMENTS

| 3,022,187 | 2/1962 | Eyraud et al. | 117/16 |
| 3,926,799 | 12/1975 | Thomas et al. | 210/23 |
| 4,088,576 | 5/1978 | Mott et al. | 427/181 |
| 4,356,215 | 10/1982 | Auriol et al. | 55/523 |
| 4,412,921 | 11/1983 | Leung et al. | 210/500.25 |
| 4,520,520 | 6/1985 | Johnston et al. | 8/151 |
| 4,762,619 | 8/1988 | Gaddis et al. | 210/639 |

Primary Examiner—Bernard Nozick

[57] ABSTRACT

A process for forming a filter and the product filter are disclosed. The filter uses a porous metal substrate, preferably in the form of a tube, preferably formed of stainless steel particles having a diameter of from 30 to 100 micrometers and a pore size of from 1 to 10 micrometers. A slurry of metal oxide particles of from 0.2 to 1.0 micrometer diameter is applied to the porous metal substrate which is dried and then the particles are sintered together by heating. The preferred metal oxides is $TiO_2$.

15 Claims, No Drawings

SINTERED COATING FOR POROUS METALLIC FILTER SURFACES

BACKGROUND OF THE INVENTION

1. Field of the Invention

The present invention relates to sintered metal filters which have been impregnated with a finely divided ceramic material such as titania and then heated so that the ceramic material sinters together.

2. Prior Art

U.S. Pat. No. 4,762,619 discloses forming a dynamic membrane on a porous sintered stainless steel support. The porous stainless steel support is impregnated with an aqueous nitrate solution, followed by a solution of polyacrylic acid, followed by a solution of sodium hydroxide to form a porous zirconia medium in the sintered metal filter.

U.S. Pat. No. 4,520,520 describes ultrafiltration membranes made from a sintered stainless steel support (316L) impregnated with zirconium oxide.

U.S. Pat. No. 3,022,187 discloses a porous membrane and process for making it by drawing by suction a suspension of grains of a metallic oxide in a fluid into a rigid sintered metal support.

SUMMARY OF THE INVENTION

The present invention relates to a filter and process for making same wherein a porous sintered metal structure is impregnated with a particulate metal oxide and the resulting structure heated to sinter the metal oxide particles to each other. The sintered metal structure preferably is made from stainless steel. The stainless steel has a melting point higher than the temperature at which the metal oxide particles sinter together.

DETAILED DESCRIPTION

It has long been recognized that it is advantageous, in filtration separations of liquids from materials ranging from coarse particles to dissolved salts, to configure the filter with pores as small as necessary for removal on the feed side and with much larger pores over the rest of the filter thickness. A striking example is the Loeb-Souririjan cellulose acetate membrane, in which manipulation of the casting procedure results in a thin homogeneous skin capable of removing dissolved salts from water, supported by a spongy porous layer, through which the desalted water passes with high permeability. Such a configuration not only allows high production rates with minimal pressure drops, but also hinders plugging of the pores in the high-permeability substructure with extraneous materials in the feed.

With formed-in-place, or dynamically formed, membranes, there are further advantages from thin layers on the feed side. For many membrane-forming additives, there are optimal pore sizes, frequently of the order of tenths of micrometers. Supports of materials preferred for many applications are not economically fabricated in these optimal pore dimensions. An example is porous metal tubes, such as stainless steel. Cost of powders, as well as fabrication procedures dictates that these have average pore sizes in the several micrometer range. Although such sizes are advantageous in that there is relatively little pressure drop in flow of fluid through them, they suffer the limitations outlined above in their use as substrates for many formed-in-place membranes. In addition, many applications would not require membranes, if the pores on the feed side were smaller. An example is removal of microorganisms or large fragments from fluids, in separation of enzymes or other biological products or in cold pasteurization.

One solution of this problem is the formation of a thin layer of small effective pore size by circulating a dispersion of small particulates through the tubes or other filter media prior to their use as filters or as supports for membranes. Although the procedure is frequently applicable, it is sometimes difficult to employ in practical systems, particularly those involving tubes with the large length-to-diameter ratios, which take advantage of the strength of porous metal tubes. The high inlet pressures allowable make it possible to attain high recoveries in single passes through the system; savings in equipment (valves, etc.) and in efficiency over recirculating batch operation are attained by long systems. However, it is difficult to attain a uniform distribution of small particles over such systems, sometimes difficult to get particles at all to regions distant from the entrance. Design of pumps and hydrodynamics to handle particulates constrains configurations and adds to expense.

It is an object of this invention to provide an economical method of fabricating porous metal support with a layer of smaller pore size fixed to one side of the support. It is a further object to provide a support suitable for formation of membranes in place by circulating solutions or dispersions of membrane materials, without prior or simultaneous use of particulates, or with minimal use of such particulates. It is a third object to provide a porous metal configuration suitable for separations from fluids or microorganisms, without adding layers of particles or membranes.

We have found that these objectives may be attained by forming a layer of metal-oxide powder on the surface of one side of a porous metal support, and by then fixing this layer in place by treatment at elevated temperature, preferably in a reducing atmosphere or an inert atmosphere.

Generally the porous metal support should be formed from non-spherical particles which have an irregular shape. These metal particles should have a particle size from 30 to 100 micrometers with from 30 to 40 micrometers being the preferred range. The support should have pore sizes from 0.5 to 10 micrometers with from 0.5 to 5 micrometers being the preferred range. Generally the support will have a porosity of 5 to 20% prior to treatment with the metal oxide support.

The porous metal support should be formed of a metal which is not corroded by the fluids it is intended to be used with and which has a melting point above the sintering temperature of the metal oxide particles being used. Generally austinitic stainless steels are preferred for use herein. The particularly preferred stainless steels are the 300 series with 316L being especially preferred.

The metal oxide particles used in the present invention are generally spherical in shape and have a particle size of from 0.2 to 1.0 micrometer. The metal oxide should be sinterable at a temperature below the melting point of the metal used to form the support. Generally the metal oxide should coalesce at below 1200° C. with from 900° to 1200° C. being the preferred range. The preferred metal oxide is titania. The anatase crystalline form of titania which is converted to the rutile crystalline form upon being heated and sintered together has given particularly good results.

The metal oxide is applied to the porous metal support in the form of a slurry particularly an aqueous slurry. Generally the volume ratio of powder to liquid will be from 0.1:1 to 3:1 with from 1.2:1 to 1.8:1 being preferred. There is a tendency for the slurry to dewater on coming into contact with the porous metal substrate. This dewatering can lead to a slurry which is undesirably viscous and difficult to handle. In such event, it is possible to wet the porous metal substrate prior to contact with the metal oxide slurry. It is preferred to apply the metal oxide slurry to a dry porous metal support. The metal oxide particles can be forced into the pores of the porous metal substrate by mechanically working with a doctor blade or in the case of a tube by filling the tube with the slurry and then drawing a tight fitting rubber stopper through the tube. Alternatively the slurry may be applied to the porous metal substrate and a pressure applied. Generally this pressure will be from 0 to 700 psi (0 to 4826 kPa) with from 0.2 to 0.7 psi (14 kPa to 48 kPa) being preferred. The pressure is generally applied for 10 to 60 seconds. When applying the slurry to the inside of a porous metal tube, the tube is filled with the slurry and held horizontally. The open end is fitted with a stand pipe which is filled with slurry to a depth of 10–12 inches (0.254–0.305 m), and the thus created pressure coupled with capillary action within the walls of the porous tube is adequate to fill the pores of the support tube to the desired level. After pressuring or mechanically working the metal oxide into the support, excess metal oxide is removed from the surface of the porous metal substrate. Various devices can be used to remove excess metal oxide slurry including brushes with stainless steel, brass, or polymeric bristles, sponge devices either wet or dry, and other devices designed to scrape excess material from the metal substrate without damaging the base metal. Some amount of water is desirable, especially if the metal oxide has been dewatered to the condition that it is viscous and difficult to manage. Excessive cleaning and use of water can create the undesirable effect of removing metal oxide from the pores of the substrate.

The next step is to dry the porous metal substrate impregnated with the metal oxide. Preferably this is done by heating over a period of several hours.

The metal oxide particles are then sintered together by heating. The temperature used must be sufficiently high for the metal oxide particles to sinter together and form an integral structure within the pores of the porous metal support. For titania the sintering temperature should be from 900° to 1200° C. with from 1050° to 1200° C. being preferred. The heating step generally lasts from 5 to 50 minutes with from 10 to 20 minutes being preferred.

In the work done all samples were well coated with metal oxide particles. There were a very few surface flaws about 1 micrometer across, and none of them appeared to penetrate deeply. Though only very slight differences were evident the higher concentration slurries appeared to produce superior coating density. The samples which were washed during slurry removal after application of slurry were virtually free of the surface litter comprised of pieces approaching 1 mm in length in the unwashed samples. When the steel surface was cleaned of the surface layer of metal oxide particles, a little undercutting of the deposit in the pores was observed.

A view of the broken edge of some of the samples indicated that the metal oxide particles had penetrated the pores of the porous metal substrate to a depth of 50 to 100 micrometers.

EXAMPLE 1

A hollow sintered metal tube formed of 316L stainless steel particles which are of irregular shape and about 30 micrometers across their largest dimension and which tube has pores of from 1 to 10 micrometers in diameter, an outside diameter of 1.7 inch (4.3 cm) and an inside diameter of 1.25 inch (3.175 cm) and a length of 2 feet (0.61 m) is used. The tube is horizontally disposed and filled with a slurry of 3 parts by volume $TiO_2$ and 1 part by volume water using a 1 foot (0.30 m) head and 10 seconds contact time. The tube has been prewet with water. The $TiO_2$ is of the anatase crystalline form and in the form of generally spherical particles having an average diameter of 0.3 micrometer. The tube is drained and a snugly fitting plug drawn through the tube to produce a dense cake of powder extending from 30 to 100 microns into the tube. Washing with water and scrubbing the inside surface of the tube removes a light coating of powder from the metal surface and erodes the surrounding sea of powder somewhat.

The tubes are dried by standing in air at a slightly elevated temperature for several hours.

The tube and powder are heated at 2000° F. (1093° C.) in a reducing (hydrogen) atmosphere for 10 minutes to sinter the $TiO_2$ particles and convert them to the rutile crystal form. The further consolidation of the stainless steel, though minor, tends to offset the shrinkage of the $TiO_2$ so that formation of cracks in the sintered coalesced product is minimal.

EXAMPLE 2

Tubes as described in Example 1, except that the porous stainless steel substrate is dry and the ratio of $TiO_2$ powder to water in the $TiO_2$ slurry applied thereto is 1.6:1 by volume (1:1 by weight), are used to filter a stream containing approximately $10^8$ per 100 ml S. lactis bacteria in peptone solution. S. lactis is a spherical bacterium approximately 1 micrometer in diameter, used as a starter culture in preparing fermented milk products. Twenty test sections were heat sterilized and operated producing filtrate with LRV [LRV (log reduction value) is $\log_{10}$ (Feed count)$-\log_{10}$ (filtrate count)] of 7.84 on average. By comparison the unaltered tube seldom has LRV of 1. With a ZOPA membrane in place the LRV of one membrane tube was at least 8, there being no (less than 1) bacteria in the filtrate. A Z0PA membrane on unaltered tubes will seldom exceed LRV=2. A ZOPA membrane is a commercial membrane formed from ZrO and polyacrylic acid by chemical deposition on the same 316L stainless steel support as used in Example 1 above. ZOPA membranes are further described in U.S. Pat. Nos. 4,762,619 and 4,520,520.

EXAMPLE 3

The subject tubes similar to those prepared in Example 1 were compared with conventional tubes prepared with filter aid for the application of membranes. A simulated cleaning cycle with back flow was executed typical of food applications: 1. Pass a sponge ball, 2. Circulate ¼% aqueous solution of citric acid at 70° C., 3. Base and peroxide wash with detergents, 4. Acid wash with Ultrasil® at 70° C. Ultrasil® is a cleaner containing 30% nitric acid and 25% phosphoric acid. The subject tube changed less than 10% from its prior value for Flux/Pressure while the tube coated with conventional filter aid increased its value more than 100% indicating substantial removal of the filter aid.

EXAMPLE 4

In actual tests on apple puree, polymeric membranes prepared with filter aid on tubes with improved substrates (as prepared in Example 1) and on conventional substrates were operated with a tube of improved substrate without polymeric membrane. During the testing, the membraned improved substrate tube (membraned after cycle 1) was operated near the front and the unmembraned one at the aft station of the train of tubes. All tubes were operated, cleaned (cleaning removes the membrane), and selected tubes reformed for several cycles. The improved substrate tube near the front was operated without the membrane for the first cycle only. The progressive values of water flux/pressure at standard conditions following cleaning during 5 cycles is reported in the following table.

TABLE

| End of Cycle | Conventional gfd/psig | Improved Substrate gfd/psi | |
|---|---|---|---|
| | | With Membrane | Without Membrane |
| 1 | 16 | 6.7* | 5.2 |
| 2 | 17 | 7.3 | 4.3 |
| 3 | 14 | 7.5 | 6.1 |
| 4 | 28 | 7.1 | 6.2 |
| 5 | 22 | 7.4 | 5.9 |

*Cycle 1 operation without the membrane

In the Table gfd/psi stands for gallons per square foot of membrane per day per pound per square inch pressure above the pressure of the filtrate.

The water flux/pressure values for these two tubes are reported separately under Improved Substrate in the Table. The improved substrate tubes were noticeably more stable.

The operating fluxes in gfd were found to be higher than the adjacent conventional tubes by 42 and 30 compared with 15 and 28 on the first day. On the third day they were 33 and 33 compared with 23 and 26.

EXAMPLE 5

Conventional substrates with ZOSS (zirconium oxide on stainless steel) membrane coatings, as disclosed in U.S. Pat. No. 4,762,619, without the polyacrylic acid component or in U.S. Pat. No. 4,520,520, have been operating for more than 3 years on an industrial plant process effluent consisting of 5 to 10% by weight sodium hydroxide solutions contaminated with process materials. Tests have been conducted for over 9 months comparing tubes with the improved substrate of the present invention with those conventional tubes with membranes. The average flux is greater than 75 gfd compared with 15 gfd for the conventional preparation. The improved substrate tubes of the present invention require no recoating compared to a monthly cycle for conventional tubes and the operating time between cleaning cycles for improved substrate tubes of the present invention is twice that of conventional tubes. Industrial plant tests have also demonstrated the ability to remove contaminants from 25% sodium hydroxide solutions and to concentrate dilute dye particles without use of a membrane as required when conventional substrate is utilized.

EXAMPLE 6

Laboratory tests with improved and conventional substrates with ZOSS membranes have been conducted on Du Pont Elvanol ® T-25 LR. Test conditions of 5% PVA and 0.5% wax (conforming to typical textile applications) at 85° C. and 11 ft/sec (3.3 m/sec) cross velocity in $\frac{5}{8}$ inch (2.6 cm) diameter tubes have been maintained. After 30 minutes the membranes using the improved substrates of the present invention maintained about 6 gfd/psi whereas the conventional membranes maintained between 1 and 2 gfd/psi.

EXAMPLE 7

Semi-Mechanical Pulping Digestion Liquor (SCMP)

One of many processes in the pulp and paper industry produces the SCMP feed stream. A feed volume was operated in batch mode with permeate removed until the concentrate volume became approximately one-half its original value (50% recovery). Three membranes, two on improved substrates of the present invention and one on a conventional substrate, each with ZOSS coatings were tested. The improved substrate membranes of the present invention produced fluxes of 90 gfd average, while the conventional membrane registered 40 gfd. Removal of color was simultaneously superior for the altered substrate.

We claim:

1. A filter comprising a porous metal substrate formed from particles having a diameter of from 30 to 100 micrometers and a pore size of from 0.5 to 10 micrometers, the pores of which on one side of the substrate are filled to a depth of 30 to 100 micrometers with sintered metal oxide powder having a diameter of from 0.2 to 1.0 micrometers.

2. The filter of claim 1 wherein the metal oxide powder is $TiO_2$.

3. The filter of claim 2 wherein the porous metal substrate is made from stainless steel.

4. The filter of claim 3 wherein the stainless steel is a 300 series stainless steel.

5. The filter of claim 4 wherein the stainless steel is 316L stainless steel.

6. The filter of claim 5 wherein the $TiO_2$ is in the rutile crystal form.

7. A process for forming a filter comprising treating a porous metal substrate formed from particles having a size of from 30 to 100 micrometers, and pores of from 0.5 to 10 micrometers, with a slurry of sinterable metal oxide particles having a diameter of from 0.2 to 1.0 micrometers to fill the pores in the porous metal substrate to a depth of 30 to 100 micrometers, drying the porous metal substrate and metal oxide particles until substantially free of liquid, heating the substrate and metal oxide particles to a temperature sufficient to sinter the metal oxide particles to each other, but not high enough to melt the porous metal substrate.

8. The process of claim 7 in which the powder is $TiO_2$.

9. The process of claim 8 wherein the tube is heated to from 900° to 1200° C. to sinter the powder.

10. The process of claim 9 wherein the porous metal substrate is made from stainless steel.

11. The process of claim 10 wherein the liquid in the slurry is water and the volume ratio of $TiO_2$ powder to liquid in the slurry is from 0.1:1 to 3:1.

12. The process of claim 11 wherein the stainless steel is a 300 series stainless steel.

13. The process of claim 12 wherein the stainless steel is 316L.

14. The process of claim 13 wherein the volume ratio of $TiO_2$ powder to water is from 1.2:1 to 1.8:1.

15. The process of claim 14 wherein the $TiO_2$ is in the anatase form as applied to the substrate and in the rutile form after sintering.

* * * * *